(12) United States Patent
Myers, Jr. et al.

(10) Patent No.: US 10,929,907 B1
(45) Date of Patent: Feb. 23, 2021

(54) AUTOMATION PLATFORM FOR THE INTERNET OF THINGS

(71) Applicant: PetroCloud LLC, Irving, TX (US)

(72) Inventors: John Daniel Myers, Jr., Plano, TX (US); Lance White, Southlake, TX (US); Luis Manuel Eduardo Lobo Borobia, Buenos Aires (AR); Nicholas Roy Erickson, Plano, TX (US); Keaton Quinn Foster, Fort Worth, TX (US); William Rhet Wylie, Irving, TX (US); Eric Olazaba, Lewisville, TX (US); Adam Christopher Mao, Dallas, TX (US); Mudrekh Shaukat Goderya, Aledo, TX (US)

(73) Assignee: PetroCloud LLC, Irving, TX (US)

( * ) Notice: Subject to any disclaimer, the term of this patent is extended or adjusted under 35 U.S.C. 154(b) by 16 days.

(21) Appl. No.: 16/025,635

(22) Filed: Jul. 2, 2018

Related U.S. Application Data

(63) Continuation of application No. 14/696,194, filed on Apr. 24, 2015, now abandoned.

(60) Provisional application No. 61/984,635, filed on Apr. 25, 2014.

(51) Int. Cl.
| | |
|---|---|
| *G06F 15/16* | (2006.01) |
| *G06Q 30/06* | (2012.01) |
| *H04L 12/24* | (2006.01) |
| *G06F 16/245* | (2019.01) |

(52) U.S. Cl.
CPC ....... *G06Q 30/0621* (2013.01); *G06F 16/245* (2019.01); *G06Q 30/0625* (2013.01); *G06Q 30/0641* (2013.01); *H04L 41/145* (2013.01)

(58) Field of Classification Search
CPC .......... H04L 29/06; H04L 29/12; G06F 17/30
See application file for complete search history.

(56) References Cited

U.S. PATENT DOCUMENTS

| | | | |
|---|---|---|---|
| 8,971,274 B1* | 3/2015 | Teller | H04W 40/02 370/329 |
| 2003/0095141 A1* | 5/2003 | Shah | G06F 9/44505 715/735 |
| 2004/0098377 A1* | 5/2004 | Kraft | G06Q 30/0611 |
| 2011/0258173 A1* | 10/2011 | Ratiner | G06F 16/332 707/706 |

(Continued)

*Primary Examiner* — SM A Rahman
(74) *Attorney, Agent, or Firm* — Fish & Richardson P.C.

(57) ABSTRACT

Providing an automation platform for the Internet-of-Things (IoT) includes receiving a request to access a marketplace to build a desired mashup of IoT-enabled Nodes for the automation platform, where the marketplace allows a search for and purchase of the IoT-enabled nodes, where a node is network-enabled device, sensor, or service, and where the automation platform allows performing automated tasks using the IoT-enabled nodes based on events for triggering evaluation, statuses for use in conditional statements, and actions for when a set of conditions are satisfied. A search term is received for the desired mashup and a presentation of a list of automation platform blueprints, nodes, services, and end points that match the search term is initiated. An end point is selected from the initiated presentation and a node builder tool is accessed that permits systematic configuration of a node for the selected end point for compatibility with the automation platform.

20 Claims, 6 Drawing Sheets

(56) References Cited

U.S. PATENT DOCUMENTS

| | | | |
|---|---|---|---|
| 2011/0276886 A1* | 11/2011 | Hall | G06Q 10/06 715/734 |
| 2012/0076139 A1* | 3/2012 | Tanizawa | H04L 69/24 370/389 |
| 2015/0019342 A1* | 1/2015 | Gupta | G06Q 10/20 705/14.66 |
| 2015/0039470 A1* | 2/2015 | Crites | G06Q 30/0623 705/26.61 |
| 2015/0081798 A1* | 3/2015 | Lee | H04L 67/2809 709/205 |
| 2015/0169768 A1* | 6/2015 | Xu | G06F 16/951 707/770 |
| 2015/0213138 A1* | 7/2015 | Lee | H04W 4/70 707/736 |
| 2015/0264138 A1* | 9/2015 | Watts, Jr. | H04L 67/1095 709/203 |
| 2015/0365461 A1* | 12/2015 | Oh | G06F 16/951 709/201 |
| 2016/0055573 A1* | 2/2016 | Chen | G06Q 30/0641 705/26.41 |
| 2016/0065653 A1* | 3/2016 | Chen | H04L 67/10 715/735 |
| 2016/0085884 A1* | 3/2016 | Schafer | H05B 37/0272 703/1 |
| 2016/0241641 A1* | 8/2016 | Mazor | H04W 4/70 |
| 2016/0275190 A1* | 9/2016 | Seed | H04L 67/02 |
| 2017/0039038 A1* | 2/2017 | Huber | G06F 8/34 |

* cited by examiner

AUTOMATION PLATFORM FOR THE INTERNET OF THINGS

CROSS-REFERENCE TO RELATED APPLICATIONS

This application is a continuation application of U.S. patent application Ser. No. 14/696,194, filed Apr. 24, 2015 and claims priority to U.S. Provisional Application Ser. No. 61/984,635, filed on Apr. 25, 2014.

BACKGROUND

The Internet-of-Things (IoT) refers to an Internet-like structure of networked uniquely identifiable objects and their representations. In some implementations, the objects can possess degrees of autonomous intelligence. The objects can provide information through data capture and communication capabilities which can be used to drive actions based on the received information. The objects can be remotely controlled over the network, if permitted to do so by security/privacy settings and functionality. The IoT infrastructure includes existing and evolving Internet and network developments and can offer specific object-identification, sensor and connection capability as the basis for the development of independent cooperative services and applications, including mash-ups. These will be characterized by a high degree of autonomous data capture, event transfer, network connectivity and interoperability. Current IoT functionality is limited due to, among other things, inconsistent definitions and standards and lack of a simple and robust controlling service and real-time interface. These deficiencies discourage and limit wide scale adoption of the IoT.

SUMMARY

The present disclosure describes methods and systems, including computer-implemented methods, computer program products, and computer systems for providing an automation platform for the Internet-of-Things (IoT).

Providing an automation platform for the Internet-of-Things (IoT) includes receiving a request to access a marketplace to build a desired mashup of IoT-enabled Nodes for the automation platform, where the marketplace allows a search for and purchase of the IoT-enabled nodes, where a node is network-enabled device, sensor, or service, and where the automation platform allows performing automated tasks using the IoT-enabled nodes based on events for triggering evaluation, statuses for use in conditional statements, and actions for when a set of conditions are satisfied. A search term is received for the desired mashup and a presentation of a list of automation platform blueprints, nodes, services, and end points that match the search term is initiated. An end point is selected from the initiated presentation and a node builder tool is accessed that permits systematic configuration of a node for the selected end point for compatibility with the automation platform One computer implemented method includes receiving a request to access a marketplace to build a desired mashup of Internet-of-Things (IoT)-enabled Nodes for an automation platform, wherein the marketplace allows a search for and purchase of the IoT-enabled nodes, wherein a node is network-enabled device, sensor, or service, and wherein the automation platform allows performing automated tasks using the IoT-enabled nodes based on events for triggering evaluation, statuses for use in conditional statements, and actions for when a set of conditions are satisfied; receiving a search term for the desired mashup; initiating a presentation of a list of automation platform blueprints, nodes, services, and end points matching the search term; selecting an end point from the initiated presentation; and accessing a node builder tool to permit systematic configuration of a node for the selected end point for compatibility with the automation platform.

Other implementations of this aspect can include corresponding computer systems, apparatuses, and computer programs recorded on one or more computer-readable media/storage devices, each configured to perform actions of methods associated with the described thermal imaging accessory. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the mashup is of device-to-device, device-to-service, service-to-device, or service-to-service.

A second aspect, combinable with the general implementation, comprising, following the initiating of the presentation: selecting a blueprint, node, service, or end point in an application store; and adding the selected blueprint, node, service, or end point into a user toolbox.

A third aspect, combinable with the general implementation, comprising initiating a presentation in the node builder tool of a list of input/output (I/O) modules responsive to a chosen end point.

A fourth aspect, combinable with the general implementation, comprising initiating a presentation of a list of remote terminal units (RTUs) responsive of a chosen I/O module.

A fifth aspect, combinable with the general implementation, comprising initiating presentation of a list of libraries responsive to a chosen RTU.

A sixth aspect, combinable with the general implementation, comprising initiating presentation of a list of dashboards for displaying data for at least one of the chosen end point, I/O module, RTU, and chosen library.

The subject matter described in this specification can be implemented in particular implementations so as to realize one or more of the following advantages. First, any network enabled device, sensor, and online service (a "Node") is capable of being interfaced, monitored, queried, and/or controlled remotely through the described automation platform (i.e., "Nodify" or "Nodify Platform.") This enables simplified, widespread adoption/implementation of the IoT. For example, a Nodify Box that is pre-loaded with an operating system (e.g., LINUX, WINDOWS, and/or other operating system), Nodify libraries, and/or hardware can run on the Nodify Platform (i.e., be "Nodify-enabled") and be used to bridge a connection between a Node(s) and the Internet/network if the Node is not directly network/Internet capable. Second, an application programming interface (API) is made public to allow greater user flexibility, enhancement suggestions to be made, and widespread adoption as compared to custom, proprietary remote monitoring/automation platforms. Nodify provides real-time, node-generated events, actions, and statuses using standard, device agnostic browser technology as an interface. No browser plugins are necessary for real-time functionality. Third, a consumer can also create mashups of devices-to-devices, devices-to-services, services-to-devices or services-to-services for the purpose of automation. Fourth, Nodes can be catalogued on the Nodify Platform and enabled by the user. Fifth, an available Marketplace permits users to purchase new Nodes, services, Nodify Blueprints, etc. Sixth, a Node Builder tool can be used to create network/Internet-communicative Nodes from non-Node-enabled devices or sensors (i.e., convert the device or sensor to be Nodify-enabled and to operate on the Nodify Platform). Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
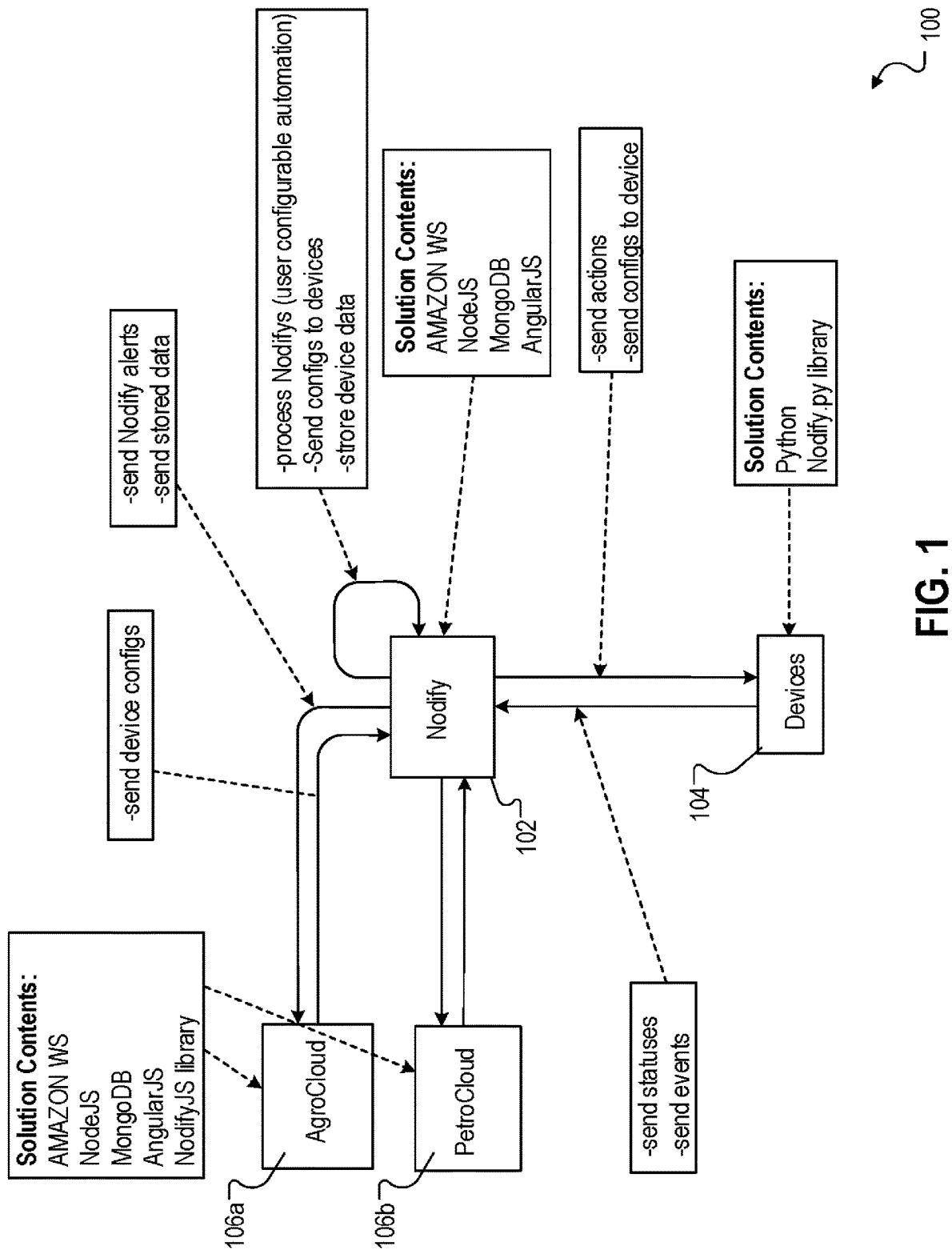
FIG. 1 is a block diagram of a Nodify Platform according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Nodify is an automation platform for the Internet-of-Things (IoT) that enables interaction between devices, sensors, and online services (Nodes) through the use of a real-time browser front-end. Nodify consists of a set of services and libraries, that allows Nodes to interact with Nodify. A Node can be any Device, Sensor or Service—any kind of entity that is compatible with Nodify's Nodify Server public interface (including an application programming interface (API) described in detail below). Nodes are configured with events (used as triggers), statuses (used as additional conditions) and actions to perform based on the events and/or statuses. The self-service platform is industry-, device-, and service-agnostic and allows any device manufacturer, systems integrator, or developer to use a Nodify supplied software library to connect to a Node through a Nodify Server using whichever language or operating system it is already built to run, allowing it to communicate with Nodify and provide real-time, device-generated events, actions, and statuses.

The Nodify Server executes the Nodify Engine. The Nodify Engine understands how Nodes are structured through their respective events, statuses, and actions. Device properties tie events and statuses together by reference and keep the Node state in sync between the Nodify server and a particular Node. Nodify projects are sets of conditions which contain events and statuses, and which execute a set of actions when evaluated as TRUE.

Nodify client libraries are provided in various computing languages (e.g., C++, JAVA, and/or other computing languages). In some implementations, Nodify client libraries can be open source, while in other implementations, the client libraries can be wholly or partially proprietary. Communications are transport-independent (e.g., HTTP, web sockets, etc.). Nodify allows any number of devices that would normally "talk" with completely different protocols to "speak" the same language in order to be automated. In typical implementations, this is performed using a wrapper over Nodify's existing protocols (e.g., Modbus, Hart, etc.). Nodify allows for users to create their own devices and/or services and to add them to the Nodify Platform for use.

If a device is not capable of connecting to a network/Internet, a developer can use a Nodify Box that is pre-loaded with an operating system (e.g., LINUX, WINDOWS, and/or other operating system), Nodify libraries, and/or hardware can run on the Nodify Platform (i.e., be "Nodify-enabled") and be used to bridge, Nodify libraries, and/or hardware to bridge a connection between the device and the Internet/network. The Nodify Box is capable of running Nodify services even when disconnected from the network/Internet. Typically, the Nodify Box can be configured from a website-like interface (e.g., in some implementations the website-like interface is generated by the Nodify Server) and is connected to any of the devices desired to be automated. In this way, a user has the ability to run mission-critical automation tasks even in the event of network or other communication failure.

In some implementations, a user (e.g., a consumer) can also create mashups of devices-to-devices, devices-to-services, services-to-devices or services-to-services for the purpose of automation with a real-time interface using only standard web browsers—the typical implementation. In other implementations, native applications and tools can also be offered to allow specific and/or enhanced features (e.g., security, etc.). The Nodify Platform can be used in different markets (e.g., industrial or consumer markets). Nodes and/or other elements of the Nodify Platform can interact between the different markets. Nodes are catalogued on the Nodify Platform and enabled by the user.

In some implementations, the Nodify Platform permits users to create custom Nodify Dashboards. A Nodify Dashboard acts as a front-end interface for viewing, monitoring, and controlling their Nodes.

In some implementations, the Nodify Platform contains a Nodify Marketplace. The Nodify Marketplace includes an end-user store and community to share/sell Nodify creations with other users. Users can buy, share, and sell devices, services, and/or dashboards which together form a "Nodify Blueprint." When a user purchases a Nodify Blueprint they can start a Nodify Project as an instance of that Nodify Blueprint. This allows users to very quickly leverage prior user experience and effort for their own purposes.

As an example: User A needs to get an alert when temperature of their fish aquarium is above 75 degrees F. User A looks for "temperature sensor" on the Nodify Marketplace. The Nodify Marketplace guides User A to a set of already available temperature sensors that $3^{rd}$ party companies sell through the Nodify Marketplace and a list of Nodify Blueprints that other users have created and shared. Once a user has selected a temperature sensor, the Nodify Marketplace alerts User A of available wireless input/output (I/O) modules for a chosen sensor. User A is then provided a list of Nodify Platform-enabled remote terminal units (RTU's) and a list of available libraries for a selected RTU. A list of available dashboards used for configuring, monitoring, etc. all selected components is then supplied. The Nodify Marketplace provides relationships between the different components and helps guide User A to a solution by recommending available "tools" to solve the problem (here needing to receive an alert if the fish aquarium is above 75 degrees F.). Note that if a presented Node is not Nodify-enabled, the user can then use the Nodify platform (the Node/App Builder) to enable the Node for use on the Nodify Platform (see FIG. 4 and related description).

FIG. 1 is a block diagram 100 of a Nodify Platform according to an implementation. In some implementations, Nodify Server 102 is hosted in a web services/cloud-computing-type computing environment, for example AMAZON, GOOGLE, and/or other web services.

Figure 2:
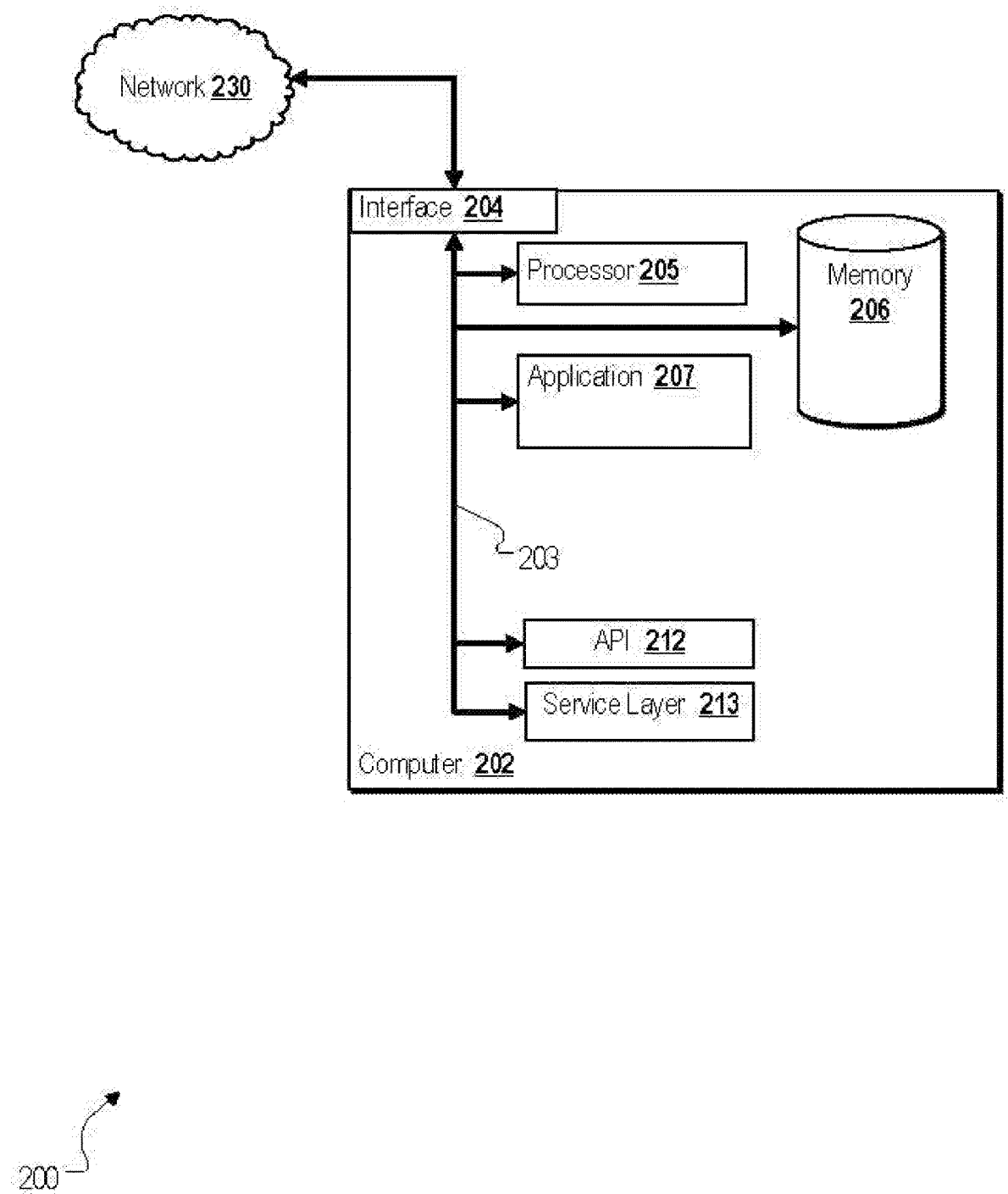
FIG. 2 is a block diagram of an exemplary computer used in the Nodify Platform according to an implementation.

Referring to FIG. 2, FIG. 2 is a block diagram 200 of an exemplary computer 202 used in the described Nodify Platform according to an implementation. The illustrated computer 202 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 202 may comprise a computer that includes an input device, such as a keypad, keyboard, touch screen, or other device that can accept user information, and an output device that conveys information associated with the operation of the computer 202, including digital data, visual and/or audio information, or a GUI.

The computer 202 can serve as a client, server, and/or a Node (e.g., a device). The computer can also serve as a node of a cloud-based computing environment. The computer 202 can also serve as a computer for a database or other persistency and/or any other component of the Nodify Platform. The illustrated computer 202 is communicably coupled with a network 230. In some implementations, one or more components of the computer 202 may be configured to operate within a cloud-computing-based environment.

At a high level, the computer 202 is an electronic computing device operable to receive, transmit, process, store, or manage data and information associated with the Nodify Platform. According to some implementations, the computer 202 may also include or be communicably coupled with an application server, e-mail server, web server, caching server, streaming data server, business intelligence (BI) server, and/or other server.

The computer 202 can receive requests over network 230 from a client application (e.g., a web browser or application executing on another computer 202) and responding to the received requests by processing the said requests in an appropriate software application. In addition, requests may also be sent to the computer 202 from internal users (e.g., from a command console or by other appropriate access method), external or third-parties, other automated applications, as well as any other appropriate entities, individuals, systems, or computers.

Each of the components of the computer 202 can communicate using a system bus 203. In some implementations, any and/or all the components of the computer 202, both hardware and/or software, may interface with each other and/or the interface 204 over the system bus 203 using an application programming interface (API) 212 and/or a service layer 213. The API 212 may include specifications for routines, data structures, and object classes. The API 212 may be either computer-language independent or dependent and refer to a complete interface, a single function, or even a set of APIs. The service layer 213 provides software services to the computer 202 and/or the Nodify Platform. The functionality of the computer 202 may be accessible for all service consumers using this service layer. Software services, such as those provided by the service layer 213, provide reusable, defined business functionalities through a defined interface. For example, the interface may be software written in JAVA, C++, or other suitable language providing data in extensible markup language (XML) format or other suitable format. While illustrated as an integrated component of the computer 202, alternative implementations may illustrate the API 212 and/or the service layer 213 as stand-alone components in relation to other components of the computer 202 and/or Nodify Platform. Moreover, any or all parts of the API 212 and/or the service layer 213 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202 and/or Nodify Platform. The interface 204 is used by the computer 202 for communicating with other systems in a distributed environment—including within the Nodify Platform—connected to the network 230 (whether illustrated or not). Generally, the interface 204 comprises logic encoded in software and/or hardware in a suitable combination and operable to communicate with the network 230. More specifically, the interface 204 may comprise software supporting one or more communication protocols associated with communications such that the network 230 or interface's hardware is operable to communicate physical signals within and outside of the illustrated Nodify Platform.

The computer 202 includes a processor 205. Although illustrated as a single processor 205 in FIG. 2, two or more processors may be used according to particular needs, desires, or particular implementations of the computer 202 and/or the Nodify Platform. Generally, the processor 205 executes instructions and manipulates data to perform the operations of the computer 202. Specifically, the processor 205 executes the functionality required to provide an automation platform for the IoT.

The computer 202 also includes a memory 206 that holds data for the computer 202 and/or other components of the Nodify Platform. Although illustrated as a single memory 206 in FIG. 2, two or more memories may be used according to particular needs, desires, or particular implementations of the computer 202 and/or the Nodify Platform. While memory 206 is illustrated as an integral component of the computer 202, in alternative implementations, memory 206 can be external to the computer 202 and/or the Nodify Platform.

The application 207 is an algorithmic software engine providing functionality according to particular needs, desires, or particular implementations of the computer 202 and/or the Nodify Platform, particularly with respect to functionality required to provide an automation platform for the IoT. For example, application 207 can serve as the Nodify Engine, a mashup service provider, a graphical user interface (GUI) generator, and/or other application associated with the computer 202 and/or the Nodify Platform. Further, although illustrated as a single application 207, the application 207 may be implemented as multiple applications 207 on the computer 202. In addition, although illustrated as integral to the computer 202, in alternative implementations, the application 207 can be external to the computer 202 and/or the Nodify Platform.

There may be any number of computers 202 associated with, or external to, the Nodify Platform and communicating over network 230. Further, the term "client," "user," and other appropriate terminology may be used interchangeably as appropriate without departing from the scope of this disclosure. Moreover, this disclosure contemplates that many users may use one computer 202, or that one user may use multiple computers 202.

Returning to FIG. 1, in some implementations, the Nodify Server 102 executes the above-described Nodify Engine (not illustrated) either on the Nodify Server 102 or on another computing device under the control of and in communication with the Nodify Server 102. The Nodify Engine performs processing (e.g., processing Nodifyies (user configurable automation)), sending configurations to devices 104, and storing data for devices 104.

In typical implementations, the Nodify Engine has a combination of push and pull services (e.g., devices push their state to the Nodify Engine and the Nodify Engine is configured to pull device state if/when needed). Nodify Engines are capable of processing multiple, complex conditional statements that span multiple Nodes simultaneously (i.e., a mashup). In this way, for example, Node states/actions can be used as triggers to drive other Nodes, etc.

A device 104 is interfaced with the Nodify Server 102. Example devices 104 can include temperature, pressure, and stress sensors and/or online services. Other devices 104 can include any network/Internet-enabled Node. Devices 104 send, among other things, statuses and events to the Nodify Server 102. The Nodify Server 102 sends, among other things, actions and configurations to the device 104.

Services 106a and 106b represent configured Nodes communicating with the Nodify Server 102. For example, PetroCloud 106b can represent a solution of oil field equipment sensors linked to a Nodify Box communicating with the Nodify Server 102. In some implementations, elements of the services 106a/b can be hosted as web services. The Nodify Server 102 sends Nodify alerts and stored data to the services 106a/b, while the services 106a/b sends device configurations to the Nodify Server 102. As will be appreciated by those of ordinary skill in the art, FIG. 2 illustrates an example implementation of the Nodify Platform to help with understanding of the described subject matter and is not meant to limit the Nodify Platform in any way.

FIG. 1 demonstrates how multiple industry verticals and $3^{rd}$ party businesses can utilize the Nodify Platform in their own services (i.e., they can "be powered by Nodify"). In typical implementations, all that a $3^{rd}$ party business can perform with Nodify, a standalone user can perform from Nodify as well. In this way, $3^{rd}$ party businesses can have more control over their own Nodes while still utilizing the Nodify Engine.

Figure 3:
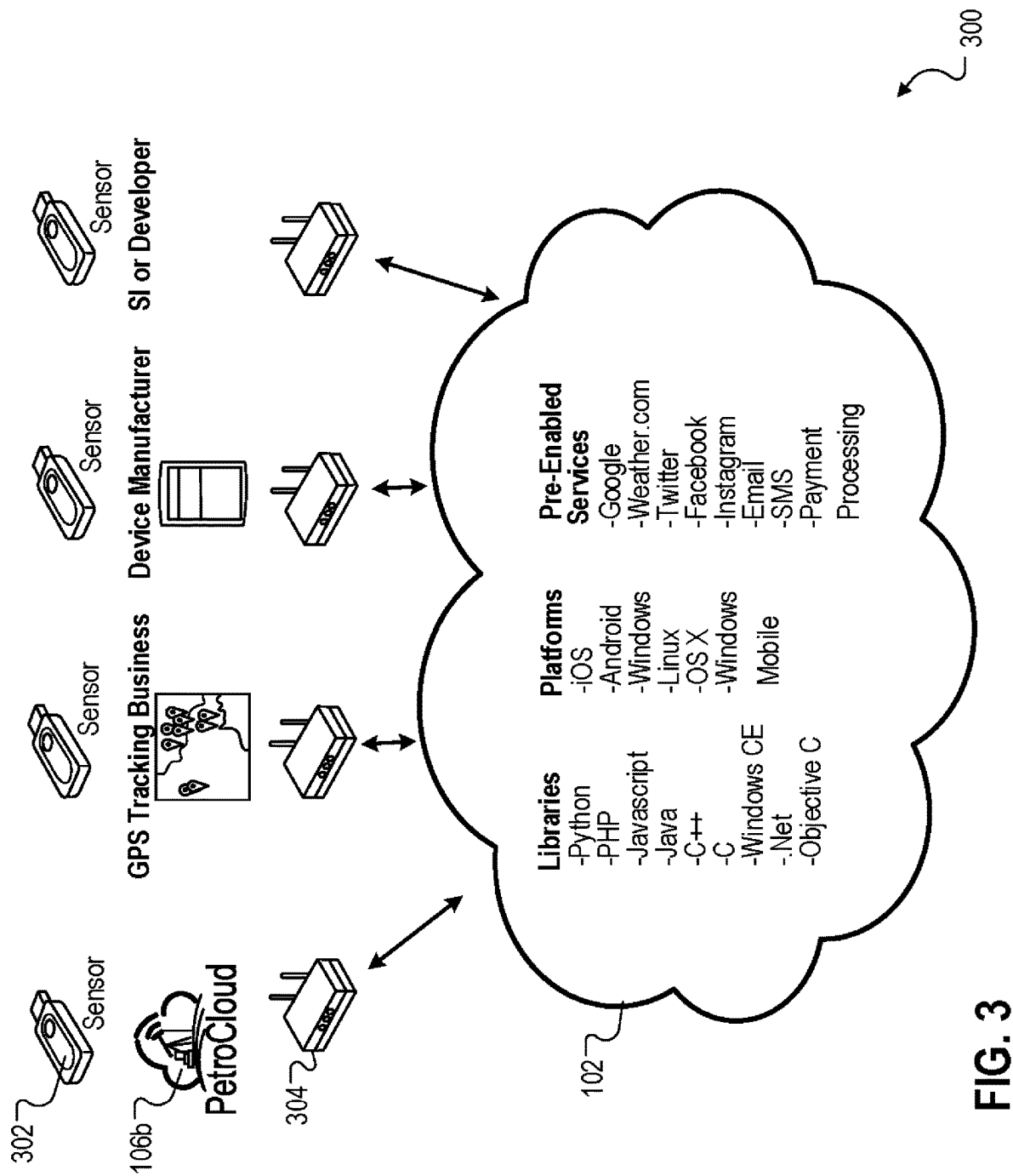
FIG. 3 is an alternative block diagram illustrating the Nodify Platform according to an implementation.

FIG. 3 is an alternative block diagram illustrating the Nodify Platform according to an implementation. As illustrated, the Nodify Server 102 is in communication with services (e.g., service 106b) and associated sensors 302 through a communication device 304 (e.g., a Nodify Box). Similarly to service 106b (PetroCloud), FIG. 3 also illustrates the Nodify Server 102 communicating with a GPS Tracking Business, Device Manufacturer, and single individual (SI). As will be appreciated by those of ordinary skill in the art, FIG. 3 illustrates an example implementation of the Nodify Platform to help with understanding of the described subject matter and is not meant to limit the Nodify Platform in any way.

Figure 4:
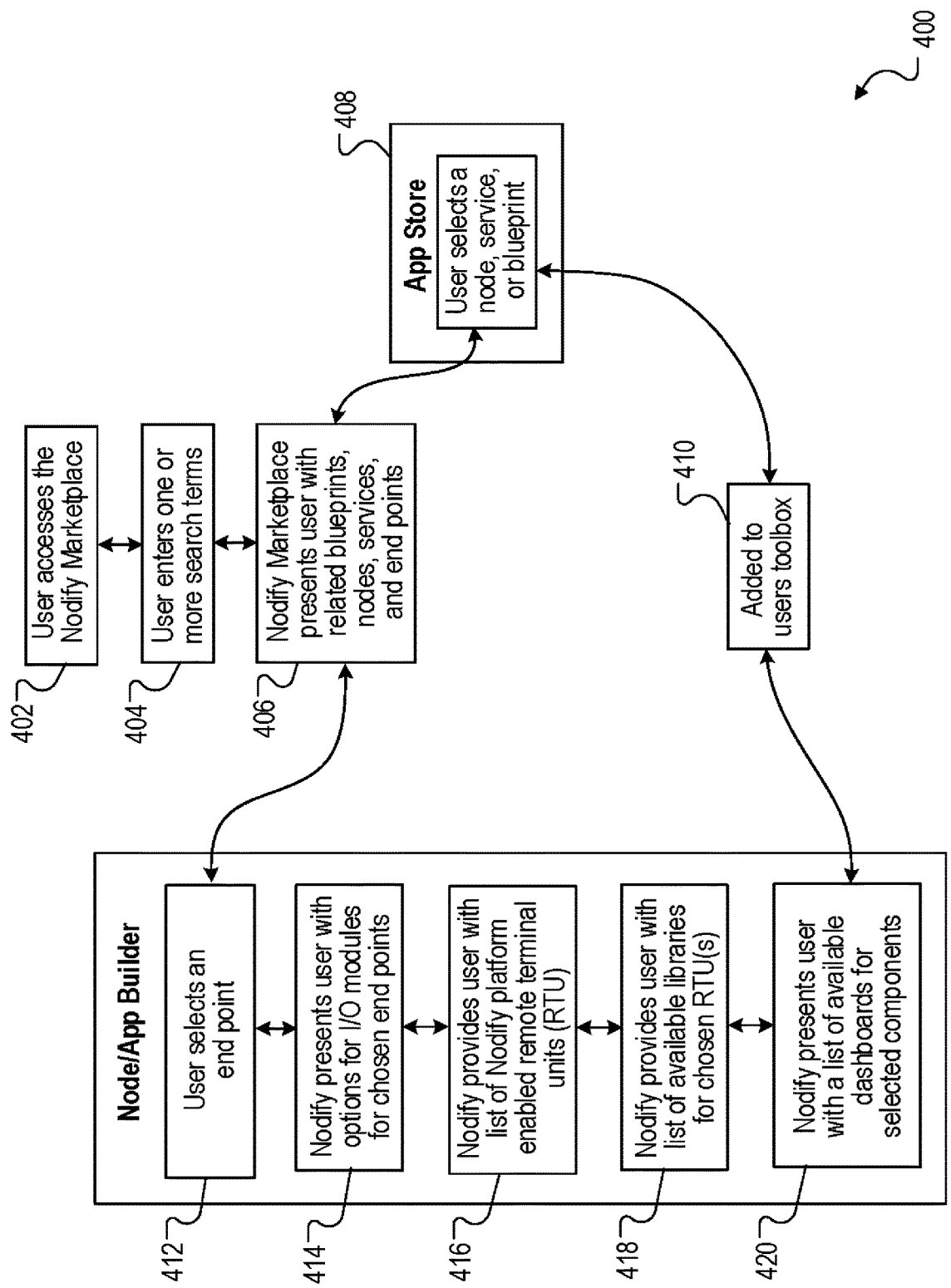
FIG. 4 is a flow chart illustrating a method for use for the Nodify Platform according to an implementation.

FIG. 4 is a flow chart illustrating a method 400 for use for the Nodify Platform according to an implementation. For clarity of presentation, the description that follows generally describes method 400 in the context of FIGS. 1-3 and 5-6. However, it will be understood that method 400 may be performed, for example, by any other suitable system, environment, software, and hardware, or a combination of systems, environments, software, and hardware as appropriate. In some implementations, various steps of method 400 can be run in parallel, in combination, in loops, or in any order.

Figure 5A:
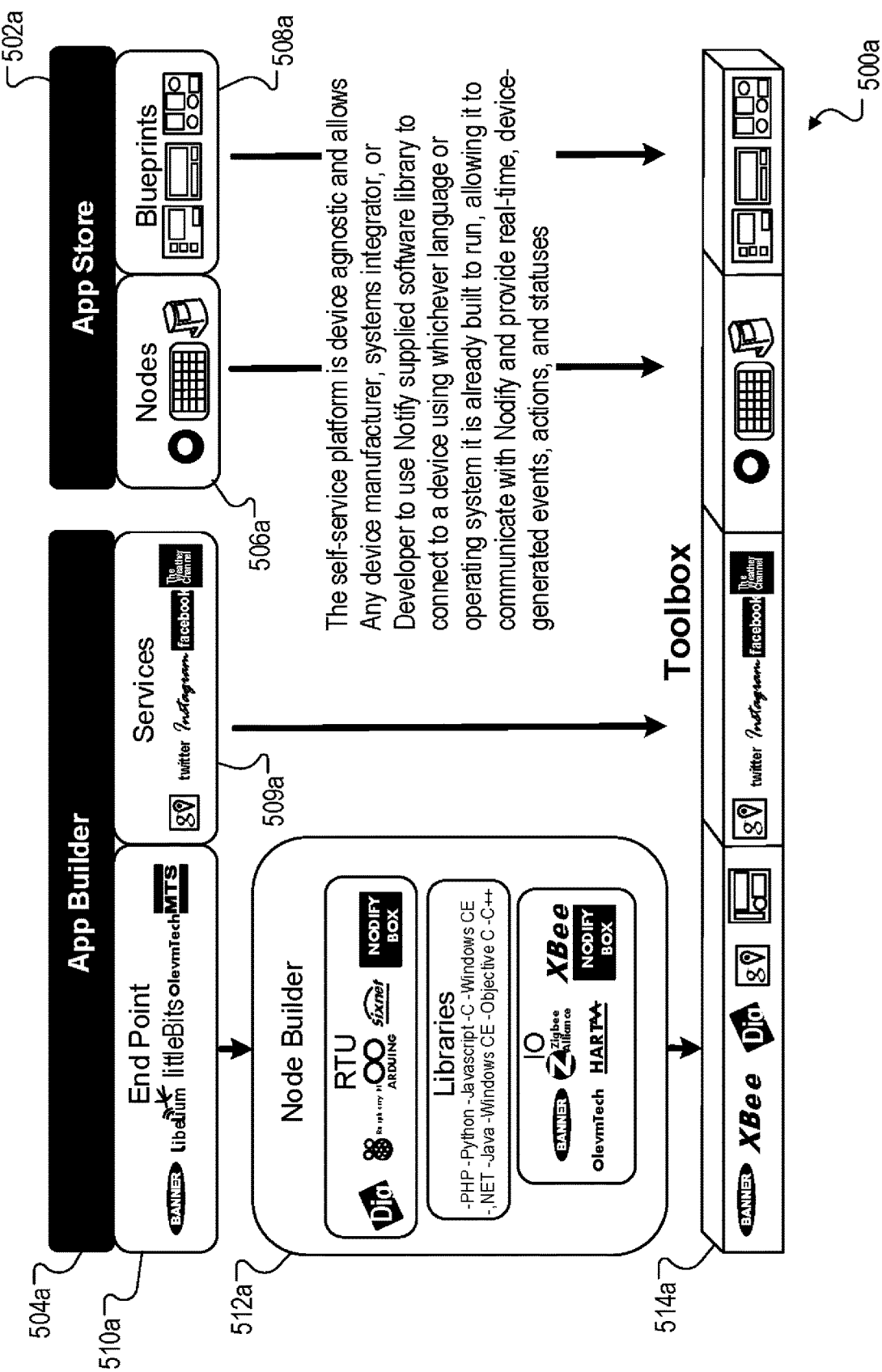
FIG. 5A is a block diagram illustrating components/functionality of a Marketplace according to an implementation.
Figure 5B:
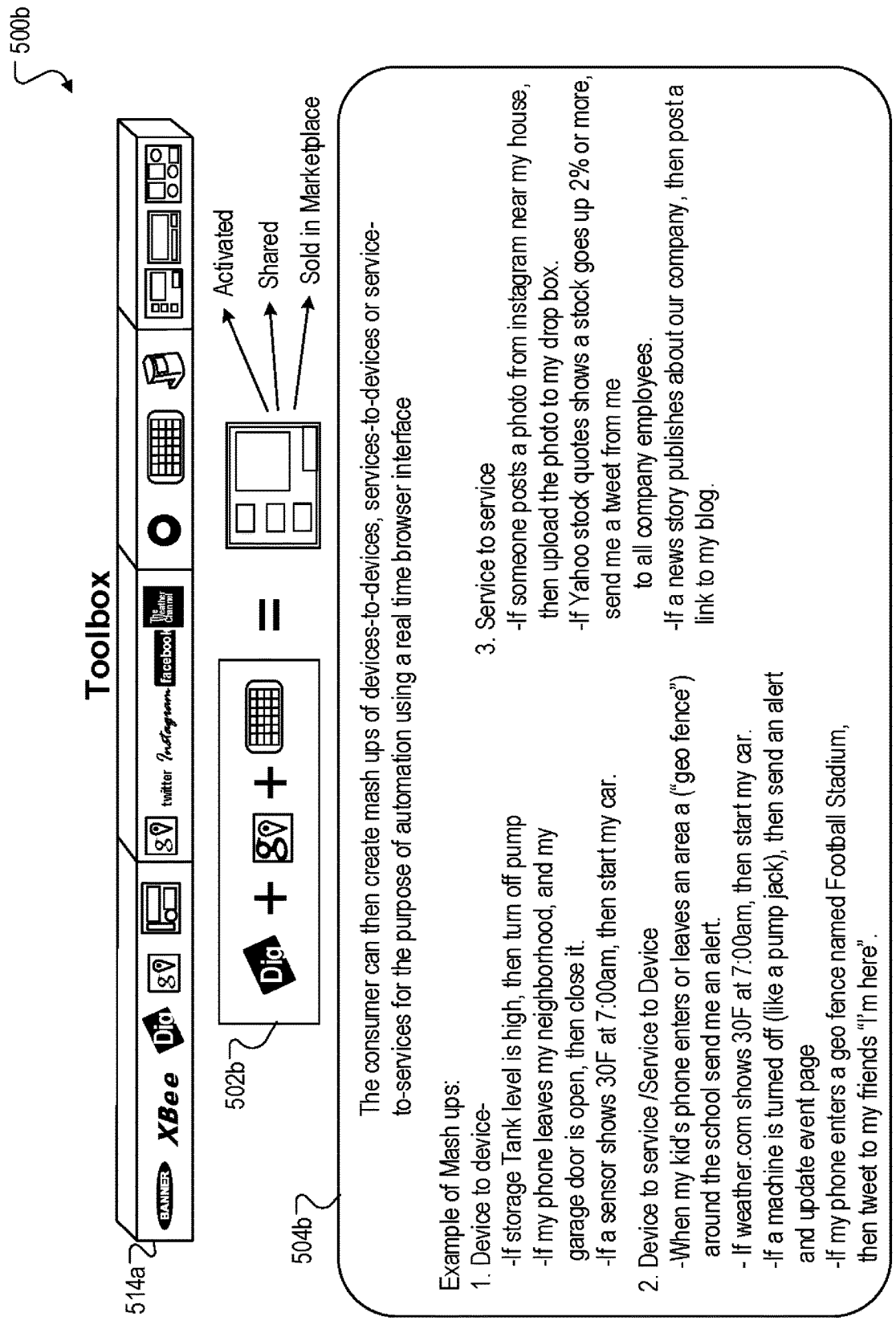
FIG. 5B is a block diagram illustrating additional components/functionality of a Marketplace according to an implementation.

At 402, a user accesses the Nodify Marketplace (see below in FIGS. 5A & 5B). Typically this would be through the user's web browser on a computing device. From 402, method 400 proceeds to 404.

At 404, the user enters one or more search terms into the Nodify Marketplace user interface. From 404, method 400 proceeds to 406.

At 406, the Nodify Marketplace initiates a presentation of a list of Nodify Blueprints (see below in FIGS. 5A & 5B—e.g., 508a), Nodes (e.g., 506a), services (e.g., 509a), and end points (see below in FIGS. 5A & 5B—e.g., 510a) to the user matching the search terms. At 408 the user has an option to select a Node, service, and/or Nodify Blueprint in an App Store (see below in FIGS. 5A & 5B—e.g., 502a) or, at 412, to select an end point and in either a Node Builder/App Builder (see below in FIGS. 5A & 5B—e.g., 512a/504a, respectively).

Enter App Store

At 408, the user selects a Node, service, and/or Nodify Blueprint. The App Store contains ready-made elements (e.g., Node, service, Nodify Blueprint, etc.) that the user can immediately start using. From 408, method 400 proceeds to 410.

At 410, the selected Node, service, and/or Nodify Blueprint is added to the user's toolbox (see below in FIGS. 5A & 5B—e.g., 514a). From 410, method 400 can proceed to 420 (see below).

Enter a Node Builder/App Builder

At 412, the user selects an end point. The Node Builder/App Builder is used as a Marketplace—the user can select end points (e.g., a gas sensor, speaker, etc.) and the Node Builder will walk the user though what is needed to get that specific end point Nodify-enabled. End point can be of an input-type (e.g., sensors and/or an output-type (e.g., audio speakers). From 412, method 400 proceeds to 414.

At 414, the Node Builder/App Builder provides the user with a list of I/O modules for a chosen end point. The user can then select one or more I/O modules from the provided list. From 404, method 400 proceeds to 416.

At 416, the Node Builder/App Builder provides the user with a list of Nodify Platform-enabled remote terminal units (RTU's). The user can then select one or more RTUs from the provided list. From 416, method 400 proceeds to 418.

At 418, the Node Builder/App Builder provides the user with a list of available libraries for the selected RTU(s). The user can then select one or more libraries from the provided list. From 418, method 400 proceeds to 420.

At 420, the Node Builder/App Builder provides the user with a list of available dashboards for the selected components in 412-418. The user can then select one or more dashboards from the provided list. In some implementations, among other things, the user can have the option to customize a selected dashboard (e.g., create panels/windows that display data from Nodes) and/or add a selected dashboard to the user's Toolbox at 410. Note that between 406/408/412, 408/410, 410/420, and other elements joined with double directional arrows, that users will be provided an option on a user interface to return to a previous step, screen, etc. For example, at 408 or 412, a user should typically be provided a route back to 406. When viewing a particular Node, service, Nodify Blueprint, or end point that a user owns, the user can be shown a list of similar products based on keywords from the item's description or various other attributes. In some implementations, similar to any online store (e.g., AMAZON, APPLE APP STORE, etc.), the user can browse items and purchase them. In some implementations, there can also be provided links to products similar to the one being viewed, purchased, etc. In some implementations, user ratings, reviews, etc. can also be available for review. The cohesiveness of the Nodify Platform to tie these functionalities together and the concept of the Node Builder provides distinct advantages to users. After 420, method 400 stops.

Marketplace

The Marketplace is an ecosystem specifically designed for the IoT. FIG. 5A is a block diagram 500a illustrating components/functionality of a Marketplace according to an implementation. FIG. 5B is a block diagram 500b illustrating additional components/functionality of a Marketplace according to an implementation. Referring to FIG. 5A, the marketplace has two main elements/aspects, an application (app) store (App Store) 502a and an application builder (App Builder) 504a.

App Store

The App Store is a software browser- and/or custom application-based environment including, in some implementations, an 1) End-User Store and 2) Community to share Nodify Platform creations (neither illustrated). Using the End-User Store and/or the Community, users can buy, share, sell, describe, etc. Nodes (devices, services, and/or dashboards) 506a which together form a "Nodify Blueprint" 508a. When a user purchases a Nodify Blueprint, they can start a Nodify Project (not illustrated) as an instance of that Nodify Blueprint. As will be appreciated by those of ordinary skill in the art, the End-User Store and/or the Community can be configured in a myriad of ways providing the described functionality.

App Builder

The App Builder 504a is a software browser- and/or custom application-based environment configured for users to create their own Nodify Blueprints from scratch from a Nodify Project integrated with the Marketplace. Users can choose from a list of services 509a and/or sensors 510a for sale or use services/sensors associated with the user's Toolbox 514a (described in more detail below). If a user-needed Node does not already exist, the user can create a new Node using the Node Builder.

Node Builder

The Node Builder 512a is a software tool (e.g., browser and/or custom application) allowing users to create new Nodes from scratch. In some implementations, the user is able to select one-to-many different sensors or "end points" 510a. These end points 510a will be available for purchase on the Marketplace and will be cataloged appropriately. An end point by itself is not enough to be Nodify-Platform compatible—the user will be given choices throughout the build process that will complete a compatible Nodify Platform-enabled device. This may include selections for technologies related to wireless, input/output (I/O), RTUs, additional software libraries, etc. (illustrated as part of Node Builder 512a). If the user does not already own a component of the entire required Node "recipe" inside their Toolbox 514a, the user can purchase the necessary component(s) from the Marketplace. In one possible example, User A needs to get an alert when a methane leak is detected. User A looks for methane gas detection Blueprints (e.g., 508a) on the Marketplace, however, User A does not find any that suit their specific needs. User A does see a standalone sensor end-point listed in the Marketplace and decides to build a custom Node from this end-point using the Node Builder 512a. Assuming that User A selects the methane gas sensor end-point 510a, the Node Builder 512a alerts the user of available wireless I/O modules that are compatible/will work with this sensor, then provides User A a list of Nodify Platform-enabled RTU's that are compatible/will work with the wireless I/O chosen, then a list of available libraries for the selected RTU, then a list of available dashboards for providing data on all selected components.

Toolbox

A user's Toolbox 514a is a list of Nodes that a particular user currently "owns." A user can select a Node from their Toolbox 514a when adding events, statuses, and actions to a generated Nodify. To add more Nodes to a user's Toolbox 514a, the user can purchase them directly from the Marketplace, build one from the Node Builder 512a, or add a pre-existing Node by typing in its license key. Referring to FIG. 5B, a mashup 502b generated from the Toolbox 514a is illustrated. FIG. 5B also describes three example mashups 504b.

Nodify API

The Nodify API provides powerful logic/multi conditions for dealing with events and actions based on the events (e.g., multiple Boolean expressions, etc.). As will be appreciated by those of ordinary skill in the art, the following example API is only one possible implementation of an API. Other possible implementations consistent with this disclosure are considered to be within the scope of this disclosure. In one possible implementation, the Nodify API could resemble the following:

Introduction
Summary
Concepts
Node
  Node Structure
    Example
  Node Properties
    Example
  Node Events
    Example
  Node Actions
    Example
  Node Statuses
    Example
  Nodify Rule Set
    Example
User
License Nodify Process
API Overview
  Responses from and to all API calls
API Reference
  nodify.init
    Available since
    HTTP Verb
    Endpoint
    Endpoint Parameters
    Post Data
    Response error codes
      1: Device could not be initialized
      2: Invalid nodeId <<nodeId>>
      3. Invalid property reference <<property-path>>
    Example
    POST Data
  nodify.event
    Available since
    HTTP Verb
    Endpoint
    Endpoint Parameters
    Post Data
    Response error codes
      2: Invalid nodeId <<nodeId>>
    Example
    POST Data Introduction This document describes Nodify functionality. It also includes an API Reference to be used by developers to integrate with the Nodify Platform.

Summary

Nodify is an automation platform for the Internet-of-Things (IOT) that enables interaction between devices, sensors, and/or online services (a "Node") through the use of a real-time browser front-end. The self-service platform is device-agnostic and allows any device manufacturer, systems integrator, developer, etc. to use a Nodify-supplied software library to connect to a device using whichever language or operating system it is already built to run, allowing it to communicate with Nodify and to provide real-time, device-generated events, actions, and statuses. If the device is not capable of connecting to the internet, the developer can use a Nodify Box that is pre-loaded with Linux and Nodify libraries to provide a communication bridge between a Node and a network.

A user can then create mashups of devices-to-devices, devices-to-services, services-to-devices or services-to-services for the purpose of automation using a real time interface using standard web browsers. This platform can be used in both industrial and consumer markets.

Nodes are catalogued on the platform and enabled by the user. Examples of mash-ups:

1. Device to Device
  a. If storage Tank level is high, then turn off pump
  b. If my phone leaves my neighborhood, and my garage door is open, then close it.
  c. If a sensor shows 30 F at 7:00 am, then start my car.
2. Device to Service/Service to Device
  a. When my kid's phone enters or leaves an area ("geo fence") around the school send me an alert.
  b. If weather.com shows 30 F at 7:00 am, then start my car.
  c. If my phone changes location, then update a google map in real time
  d. If a machine is turned off (like a pump jack), then send an alert and update event page
  e. If my phone enters a geo fence named Football Stadium, then tweet "I'm here".
3. Service to Service
  a. If someone posts a photo from Instagram near my house, then upload the photo to my DROPBOX.
  b. If Yahoo stock quotes shows a stock goes up 2% or more, send a TWEET about it.
  c. If a news story publishes about our company, then post a link to my blog.

Concepts

Nodify consists of a set of services and libraries, that allows Nodes to interact with the Nodify Platform.

Node

A Node can be any Device, Sensor or Service, any kind of entity that is compatible with Nodify's public interface.

Node Structure

A Node is conformed of Properties, Events, Actions and Statuses. A Node provider must define what a Node is capable of, using an Initial JSON object. The JSON object will be used to Initialize a Node in Nodify. In some implementations, an example can resemble:

```
Gate Access Device:
{
  "name": "Lockmaster Gate G-5",
  "id": "75",
  "model": "LM-G-5",
  "description": "Lockmaster Gate with Wifi interface and Camera",
  "properties": {
    "gateClosed": {
      "type": "boolean"
    },
    "gateAngle": {
      "type": "object",
      "properties": {
        "angle": {
          "type": "number"
        },
        "unit": {
          "type": "string"
        }
      }
    },
    "lastClosedBy": {
      "type": "string"
    },
    "lastOpenedBy": {
      "type": "string"
    }
  },
  "events": {
    "gateOpened": {
      "displayName": "Gate was opened",
      "properties": [
        "gateAngle.angle",
        "gateAngle.unit",
        "lastOpenedBy"
      ]
    },
    "gateClosed": {
      "displayName": "Gate was closed",
      "properties": [
        "gateAngle.angle",
        "gateAngle.unit",
        "lastClosedBy"
      ]
    },
    "snapshotsTaken": {
      "displayName": "Snapshot Taken",
      "properties": [
        "gateClosed",
        "lastClosedBy",
        "lastOpenedBy"
      ]
    }
}
```

```
        },
        "actions": {
          "closeGate": {
            "displayName": "Close Gate",
            "returnEvent": "gateClosed",
            "parameters": { }
          },
          "openGate": {
            "displayName": "Open Gate",
            "returnEvent": "gateOpened",
            "parameters": { }
          },
          "takeSnapshots": {
            "displayName": "Take Snapshots",
            "returnEvent": "snapshotsTaken",
            "parameters": {
              "duration": "integer",
              "timeUnit": "string",
              "waitTimeBetweenShots": "integer"
            }
          }
        },
        "statuses": {
          "gateStatus": {
            "properties": [
              "gateClosed",
              "gateAngle.angle",
              "gateAngle.unit"
            ]
          },
          "whoStatus": {
            "properties": [
              "lastClosedBy",
              "lastOpenedBy"
            ]
          }
        }
      }
```

Node Properties

Node Properties define a set of values that a Node can expose, for example, temperature, GPS coordinates, etc. Properties are defined in the Node's Initial JSON object, as a JSON object under the properties name and are used as part of conditions in Nodify Rule Sets, described below.

The structure of the Properties JSON object must be the Name of the property, and a Type. If the type is an Object, it will have a properties name with a JSON object with embedded properties as value. Types can be one of the following:

1. array A JSON array
2. boolean A JSON boolean
3. integer A JSON number without a fraction or exponent part
4. number Any JSON number. Number includes integer
5. null The JSON null value
6. object A JSON object
7. string A JSON string In some implementations, an example can resemble:

```
"properties": {
  "gateClosed": {
    "type": "boolean"
  },
  "gateAngle": {
    "type": "object",
    "properties": {
      "angle": {
        "type": "number"
      },
      "unit": {
        "type": "string"
      }
    }
```

```
    },
    "lastClosedBy": {
      "type": "string"
    },
    "lastOpenedBy": {
      "type": "string"
    }
  }
}
```

Node Events

An Event is the outcome, issue, or result of anything happening or that has happened to a Node. Events are defined in the Node's Initial JSON object, as a JSON object under the events name. Events consists of a display name, and a set of property names. The property names must correspond to the Node Properties. If a property is of type object, it is defined as the parent name, a dot, and the child name. In some implementations, an example can resemble:

```
"events": {
  "gateOpened": {
    "displayName": "Gate was opened",
    "properties": [
      "gateAngle.angle",
      "gateAngle.unit",
      "lastOpenedBy"
    ]
  },
  "gateClosed": {
    "displayName": "Gate was closed",
    "properties": [
      "gateAngle.angle",
      "gateAngle.unit",
      "lastClosedBy"
    ]
  },
  "snapshotsTaken": {
    "displayName": "Snapshot Taken",
    "properties": [
      "gateClosed",
      "lastClosedBy",
      "lastOpenedBy"
    ]
  }
}
```

Node Actions

An Action is something that can be done or performed by a Node. The actions can be called by Nodify. All Actions are asynchronous, meaning, they must return immediately. The result of an action is informed by an associated event. Actions are defined in the Node's Initial JSON object, as a JSON object under the actions name. An action can have a Display Name, a Return event, and a set of parameters that can be sent along the action. In some implementations, an example can resemble:

```
"actions": {
  "closeGate": {
    "displayName": "Close Gate",
    "returnEvent": "gateClosed",
    "parameters": { }
  },
  "openGate": {
    "displayName": "Open Gate",
    "returnEvent": "gateOpened",
    "parameters": { }
  },
  "take Snapshots": {
    "displayName": "Take Snapshots",
```

```
"returnEvent": "snapshotsTaken",
"parameters": {
    "quantity": "integer",
    "delayBetweenShots": "integer",
    "delayTimeUnit": "string"
    }
   }
  }
 }
```

Node Statuses

Node Statuses are similar to Properties and behave like Properties. Node Statuses consist of Properties that users can access and use to create a Nodify Rule Set. In some implementations, an example can resemble:

```
"statuses": {
 "gateStatus": {
    "properties": [
       "gateClosed",
       "gateAngle.angle",
       "gateAngle.unit"
    ]
 },
 "whoStatus": {
    "properties": [
       "lastClosedBy",
       "lastOpenedBy"
    ]
 }
}
```

Nodify Rule Set

A Nodify Rule Set is a set of Conditions and a set of Actions associated to Nodes. Together, they define what happens when conditions are met. The Nodify Rule Set can consist of different Conditions related to different Nodes. When all the specified Conditions are met, Actions are executed. The Actions can be Node's Actions (e.g., Take Photo Snapshot, Close Gate, Fire Alarm, etc.) or Nodify built-in Actions (e.g., Send Email, Send SMS, etc.). When an Event occurs, Node Properties are sent along with it. Also, information related to the event can be attached, for example, in an array of image URLs.

Conditions may contain Node Properties and Statuses. When all the Nodify Conditions are met, actions are fired. In some implementations, an example of Actions can resemble:

```
{
 "name": "Gate opened",
 "owner": "75",
 "conditions": [
    {
       "nodeId": "75",
       "condition": {
          "property": "gateClosed",
          "condition": "===",
          "value": false
       }
    },
    {
       "nodeId": "75",
       "condition": {
          "property": "gateAngle.angle",
          "condition": ">",
          "value": 0
       }
    }
 ],
 "actions": [
    {
       "nodeId": "75",
       "name": "takeSnapshots",
       "parameters": {
          "quantity": 300,
          "delayBetweenShots": 5,
          "delayTimeUnit": "second"
       }
    },
    {
       "nodeId": "1",
       "name": "sendSms",
       "parameters": {
          "number": "17875552123",
          "text": "Gate Opened"
       }
    },
    {
       "nodeId": "1",
       "name": "sendMail",
       "parameters": {
          "to": "luislobo@gmail.com",
          "subject": "Gate Opened",
          "body": "The gate is Open"
       }
    }
 ]
}
```

The node creates and sends events to the server as they occur. Nodify Platform, based on those events, evaluates a series of Nodifies (i.e., combination of a set of events, sets of conditions based on statuses, and a collection of actions to be taken with the conditions are met—this process is handled by a Nodify Engine) associated to the events.

User

A User is created through the www.nodify.io website. A user has associated Nodes. A User can claim the ownership of the Node by entering a License key in a Nodify Registration Application.

License

A License is created using Nodify libraries or site. A License Key contains information about the Node creator or manufacturer. Nodify Platform provides means to create valid license keys.

Nodify Process

A Node is created in Nodify automatically once it connects to the internet via its Initialization call. The Nodify Application will call http://api.nodify.io/v1/init with basic information about it, including the Node Id. A Node needs to have endpoints to receive action and status calls from the server.

The Nodify Platform communicates with and sends the calls into /modify/action and /modify/status endpoints. Devices must send events to/v1/event. Actions sent to the device are POST HTTP calls, with parameters being sent into the POST data. Nodes must return a response object immediately, and the Nodify Platform expects the action result as an Event. It's asynchronous. Status method calls are GET HTTP calls and are synchronous, that is the Nodify Platform waits for their response, with the updated status values sent back to the Nodify Platform as the body. Events sent by the device are POST HTTP calls, with parameters being sent into the POST data.

API Overview

Nodify API consists of a set of endpoints, and methods. In some implementations, API calls can use the following base url:

http://api.nodify.io

In some implementations, API calls have a version following the base URL, v1 being the latest.

http://api.nodify.io/v1

In some implementations, after the base+version url, a namespace/object may follow:

http://api.nodify.io/v1/device
http://api.nodify.io/v1/user
http://api.nodify.io/v1/status In some implementations, API calls returns a Response JSON object with information about the success or failure.

Responses from and to all API calls

In typical implementations, all Nodify API calls from or to the server returns a JSON object with the result of the API call or Device call. A successful call returns an "ok" response, and a failed call returns a "fail" response, with a "code" and a "message". Codes from 100 and up are general Nodify standard API call errors, and codes below 100, like 1, 2, 3, are codes regarding the method being called.

Example of successful response:
{
"deviceName": "Axis Camera",
"deviceId": "xx-yy-zz",
"deviceModel": "Axis-W3364",
"response": "ok"
}

Example of failed response:
{
"response": "fail",
"code": 1,
"message": "Device not found"
}

API Reference nodify.init

Whenever a device connects to the Internet, it uses this initialization method. In this call, it sends a message containing information about the device and its capabilities: supported config, events, triggers, actions and statuses.

HTTP Verb: POST
Endpoint: http://api.nodify.io/v1/init
Endpoint Parameters: None
Post Data: JSON object with the Node information.

Note: in the following table, 'R' stands for "Required" and 'x' stands for required.

| Field | Type | R | Description |
|---|---|---|---|
| name | string | x | Node name. Ex. Axis Camera |
| model | string | x | Node Model String(given by manufacturer) |
| description | string | | Node description |
| nodifyApiVersion | string | x | Nodify API version - |
| id | string | x | Node Id generated by manufacturer with a format or prefix assigned by Nodify -- we need to address the issue of authenticating the origin |
| properties | JSON | x | Object containing the JSON Schema corresponding to the Properties available from the Node |
| data | JSON | x | Information regarding the Node, like firmware version, and its capabilities. |
| events | JSON | x | Object representing a Set of Events being thrown by the Node. Ex. MotionDetection, DoorOpened, TankLevelHigh, DeviceOutOfZone and an array of Properties changed by the event. |
| actions | JSON | x | Object representing a Set of Actions that the Node can perform. Ex. TakeSnapshot, ResetCamera, StartStreaming, RecordVideo, GetStatus. It includes information of the parameters needed by the action, and the event that triggers the Action, when it finishes. |
| statuses | JSON | x | Collection of Status methods that can be called to get a specific object/value from the Node. Can be used in condition expressions |

Response Error Codes

1: Device could not be initialized

There was a problem in the Device initialization.

2: Invalid nodeId <<nodeId>>

The nodeId supplied by Node does not exist or is invalid

3. Invalid property reference <<property-path>>

The property reference supplied in an event or status does not exist in the Node's Structure In some implementations, an example showing the definition of a Gate Lock device that has http://api.nodify.io/v1/init, can resemble:

POST Data
{
"name": "Gate Lock",
"id": "xx-yy-zz",
"model": "GL-364",
"description": "This is a gate lock device",
"nodifyApiVersion": "1.1.xx",
"properties":
"accessCode":
"type": "string"
},
"doorAngle":
"type": "object",
"properties":
"angle":
"type": "number"
},
"unit":
"type": "string"
}
}
"doorClosed":
"type": "boolean"
},
"doorLocked":
"type": "boolean"
},
"peopleWithAccess":
"type": "array",
"items":
"type": "string"
}
},
"person":
"type": "string"
}
},
"data":
"firmware_version": "1.2"
},
"events":
"doorLocked":
"displayName": "The door was locked",
"properties": [
"person"
]
},

```
"doorUnlocked":
    "displayName": "The door was unlocked",
    "properties": [
        "person"
    ]
},
"doorClosed":
    "displayName": "The door was closed",
    "properties": [
        "person"
    ]
},
"doorOpened":
    "displayName": "The door was opened",
    "properties": [
        "doorAngle/angle",
        "doorAngle/unit"
    ]
}
},
"actions":
    "lockDoor":
        "displayName": "Locks the door",
        "returnEvent": "doorLocked",
        "parameters": { }
    },
    "unlockDoorAtInterval":
        "displayName": "Unlocks the door at a certain interval",
        "returnEvent": "doorUnlocked",
        "parameters":
            "from": "datetime",
            "to": "datetime"
        }
    }
},
"statuses":
    "isDoorLocked":
        "properties": [
            "doorAngle/angle",
            "doorAngle/unit"
        ]
    },
    "isDoorClosed":
        "displayName": "Is door Closed",
        "properties": [
            "doorAngle/angle",
            "doorAngle/unit"
        ]
    }
}
}
nodify.event
```

Events are received from Nodes. Nodes will call Nodify events when something happens, for example, a sensor gets activated (motion sensor), a door is opened (lock sensor), etc. with information regarding the Event. Also, an event is the response from an Action call from Nodify. Nodify calls an action, and it gets a quick answer from the device, telling that it received the Action. Then, the Node when the action is finished, triggers an Event, calling Nodify's event endpoint.

HTTP Verb: POST
Endpoint: http://api.nodify.io/v1/event
Endpoint Parameters: None
Post Data: JSON object with the event information.

Note: in the following table, 'R' stands for "Required" and 'x' stands for required.

| Field | Type | R | Description |
|---|---|---|---|
| nodeId | string | x | Node Id corresponding to the Node sending the event |
| eventName | string | x | Name of the event |
| timestamp | string | x | Timestamp of the event. Uses ISO 8601 standard. |
| properties | JSON | x | Set of values of the properties changed during the event. |
| data | JSON | x | Complimentary information about the event, that can be used by Actions. |

Response Error Codes
2: Invalid nodeId <<nodeId>>
The nodeId supplied by Node does not exist or is invalid
In some implementations, an example showing a definition of a Gate Lock device, that is reporting a "doorOpened" event, can resemble:

POST Data
```
{
"nodeId": "xx-yy",
"eventName": "doorOpened",
"timestamp": "2014-01-02T23:48:18Z",
"data": {
    "images": [
        "file1",
        "file2"
    ]
},
"properties": {
    "doorAngle": {
        "angle": 50
    }
}
}
```

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a co-processor (e.g., a graphics/visual processing unit (GPU/VPU)), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving a request to access a marketplace to build a desired mashup of Internet-of-Things (IoT)-enabled Nodes for an automation platform, wherein the marketplace allows a search for and purchase of the IoT-enabled nodes, wherein a node is network-enabled device, sensor, or service, and wherein the automation platform allows performing automated tasks using the IoT-enabled nodes based on events for triggering evaluation, statuses for use in conditional statements, and actions for when a set of conditions are satisfied;
receiving a search term for the desired mashup;
initiating a presentation of a list of automation platform blueprints, nodes, services, and end points matching the search term, wherein an end point is a sensor, or device that generates a data stream;
selecting an end point from the initiated presentation; and
accessing a node builder tool to permit systematic configuration of a node for the selected end point to provide the desired mashup of IoT-enabled Nodes that is compatible with the automation platform.

2. The computer-implemented method of claim 1, wherein the mashup is of device-to-device, device-to-service, service-to-device, or service-to-service.

3. The computer-implemented method of claim 1, comprising, following the initiating of the presentation:
selecting a blueprint, node, service, or end point in an application store; and
adding the selected blueprint, node, service, or end point into a user toolbox.

4. The computer-implemented method of claim 1, comprising initiating a presentation in the node builder tool of a list of input/output (I/O) modules responsive to a chosen end point, wherein the list of I/O modules indicates I/O modules that are compatible with the chosen end point.

5. The computer-implemented method of claim 4, comprising initiating a presentation of a list of remote terminal units (RTUs) responsive of a chosen I/O module, wherein the list of RTUs indicates RTUs that are compatible with the chosen I/O module.

6. The computer-implemented method of claim 5, comprising initiating presentation of a list of libraries responsive to a chosen RTU, wherein the list of libraries indicates libraries that are compatible with the chosen RTU.

7. The computer-implemented method of claim 6, comprising initiating presentation of a list of dashboards for displaying data for at least one of the chosen end point, I/O module, RTU, and chosen library.

8. A non-transitory, computer-readable medium storing computer-readable instructions, the instructions executable by a computer and configured to:
- receive a request to access a marketplace to build a desired mashup of Internet-of-Things (IoT)-enabled Nodes for an automation platform, wherein the marketplace allows a search for and purchase of the IoT-enabled nodes, wherein a node is network-enabled device, sensor, or service, and wherein the automation platform allows performing automated tasks using the IoT-enabled nodes based on events for triggering evaluation, statuses for use in conditional statements, and actions for when a set of conditions are satisfied;
- receive a search term for the desired mashup;
- initiate a presentation of a list of automation platform blueprints, nodes, services, and end points matching the search term, wherein an end point is a sensor, or device that generates a data stream;
- select an end point from the initiated presentation; and
- access a node builder tool to permit systematic configuration of a node for the selected end point to provide the desired mashup of IoT-enabled Nodes that is compatible with the automation platform.

9. The non-transitory, computer-readable medium of claim 8, wherein the mashup is of device-to-device, device-to-service, service-to-device, or service-to-service.

10. The non-transitory, computer-readable medium of claim 8, comprising instructions to, following the initiating of the presentation:
- select a blueprint, node, service, or end point in an application store; and
- add the selected blueprint, node, service, or end point into a user toolbox.

11. The non-transitory, computer-readable medium of claim 8, comprising instructions to initiate a presentation in the node builder tool of a list of input/output (I/O) modules responsive to a chosen end point, wherein the list of I/O modules indicates I/O modules that are compatible with the chosen end point.

12. The non-transitory, computer-readable medium of claim 11, comprising instructions to initiate a presentation of a list of remote terminal units (RTUs) responsive of a chosen I/O module, wherein the list of RTUs indicates RTUs that are compatible with the chosen I/O module.

13. The non-transitory, computer-readable medium of claim 12, comprising instructions to initiate presentation of a list of libraries responsive to a chosen RTU, wherein the list of libraries indicates libraries that are compatible with the chosen RTU.

14. The non-transitory, computer-readable medium of claim 13, comprising instructions to initiate presentation of a list of dashboards for displaying data for at least one of the chosen end point, I/O module, RTU, and chosen library.

15. A system, comprising:
a memory;
at least one hardware processor interoperably coupled with the memory and configured to:
- receive a request to access a marketplace to build a desired mashup of Internet-of-Things (IoT)-enabled Nodes for an automation platform, wherein the marketplace allows a search for and purchase of the IoT-enabled nodes, wherein a node is network-enabled device, sensor, or service, and wherein the automation platform allows performing automated tasks using the IoT-enabled nodes based on events for triggering evaluation, statuses for use in conditional statements, and actions for when a set of conditions are satisfied;
- receive a search term for the desired mashup;
- initiate a presentation of a list of automation platform blueprints, nodes, services, and end points matching the search term, wherein an end point is a sensor, or device that generates a data stream;
- select an end point from the initiated presentation; and
- access a node builder tool to permit systematic configuration of a node for the selected end point to provide the desired mashup of IoT-enabled Nodes that is compatible with the automation platform.

16. The system of claim 15, wherein the mashup is of device-to-device, device-to-service, service-to-device, or service-to-service.

17. The system of claim 15, configured to, following the initiating of the presentation:
- select a blueprint, node, service, or end point in an application store; and
- add the selected blueprint, node, service, or end point into a user toolbox.

18. The system of claim 15, configured to initiate a presentation in the node builder tool of a list of input/output (I/O) modules responsive to a chosen end point, wherein the list of I/O modules indicates I/O modules that are compatible with the chosen end point.

19. The system of claim 11, configured to initiate a presentation of a list of remote terminal units (RTUs) responsive of a chosen I/O module, wherein the list of RTUs indicates RTUs that are compatible with the chosen I/O module.

20. The system of claim 12, configured to:
initiate presentation of a list of libraries responsive to a chosen RTU, wherein the list of libraries indicates libraries that are compatible with the chosen RTU; and
initiate presentation of a list of dashboards for displaying data for at least one of the chosen end point, I/O module, RTU, and chosen library.

* * * * *